(12) United States Patent
Fattal et al.

(10) Patent No.: US 12,111,489 B2
(45) Date of Patent: Oct. 8, 2024

(54) MULTIBEAM BACKLIGHT, MULTIVIEW DISPLAY, AND METHOD WITH DIFFRACTION GRATING FILLING FRACTION

(71) Applicant: LEIA INC., Menlo Park, CA (US)

(72) Inventors: David A. Fattal, Menlo Park, CA (US); Joseph D. Lowney, Menlo Park, CA (US)

(73) Assignee: LEIA Inc., Menlo Park, CA (US)

( * ) Notice: Subject to any disclaimer, the term of this patent is extended or adjusted under 35 U.S.C. 154(b) by 132 days.

(21) Appl. No.: 17/717,071

(22) Filed: Apr. 9, 2022

(65) Prior Publication Data
US 2022/0236473 A1 Jul. 28, 2022

Related U.S. Application Data

(63) Continuation of application No. PCT/US2019/056401, filed on Oct. 15, 2019.

(51) Int. Cl.
*F21V 8/00* (2006.01)
*G02B 5/18* (2006.01)

(52) U.S. Cl.
CPC ......... *G02B 6/0036* (2013.01); *G02B 5/1814* (2013.01); *G02B 5/1861* (2013.01); *G02B 6/0055* (2013.01)

(58) Field of Classification Search
CPC .. G02B 6/0036; G02B 6/0055; G02B 5/1814; G02B 5/1861
See application file for complete search history.

(56) References Cited

U.S. PATENT DOCUMENTS

| 5,617,248 A | 4/1997 | Takahashi et al. |
| 9,128,226 B2 | 9/2015 | Fattal et al. |

(Continued)

FOREIGN PATENT DOCUMENTS

| CA | 3154377 A1 | 4/2021 |
| CN | 107111058 | 8/2017 |

(Continued)

OTHER PUBLICATIONS

International Search Report and Written Opinion (ISRWO) from the International Searching Authority (ISA/KR) dated Jul. 10, 2020 (12 pages) for counterpart parent PCT Application No. PCT/US2019/056401.

(Continued)

*Primary Examiner* — Abdulmajeed Aziz
*Assistant Examiner* — Jessica M Apenteng
(74) *Attorney, Agent, or Firm* — Schwegman Lundberg & Woessner, P.A.

(57) ABSTRACT

A multibeam backlight and multiview display employ a filling fraction of a diffraction grating to control diffractive scattering efficiency. The multibeam backlight includes a light guide configured to guide light and a plurality of multibeam elements, a multibeam element of the multibeam element plurality including a diffraction grating. The multibeam element is configured to diffractively scatter a portion of the guided light out of the light guide as directional light beams having different directions corresponding to different view directions of a multiview display. A filling fraction of diffractive features within the diffraction grating is configured to control a diffractive scattering efficiency of the multibeam element. The multiview display further includes an array of light valves configured to modulate the directional light beams to provide a multiview image. The (Continued)

filling fraction may be a ratio of diffractive features to filling features within the diffraction grating.

14 Claims, 7 Drawing Sheets

(56) References Cited

U.S. PATENT DOCUMENTS

| | | | |
|---|---|---|---|
| 9,201,270 | B2 | 12/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 9,785,119 | B2 | 10/2017 | Taff et al. |
| 10,082,613 | B2 | 9/2018 | Fattal et al. |
| 10,345,505 | B2 | 7/2019 | Fattal |
| 10,551,546 | B2 | 2/2020 | Fattal |
| 10,649,128 | B2 | 5/2020 | Fattal et al. |
| 10,705,281 | B2 | 7/2020 | Fattal et al. |
| 10,798,371 | B2 | 10/2020 | Fattal |
| 10,802,212 | B2 | 10/2020 | Fattal |
| 10,802,443 | B2 | 10/2020 | Fattal |
| 10,810,917 | B2 | 10/2020 | Fattal |
| 10,830,939 | B2 | 11/2020 | Fattal et al. |
| 10,838,134 | B2 | 11/2020 | Fattal et al. |
| 10,852,560 | B2 | 12/2020 | Fattal |
| 10,884,175 | B2 | 1/2021 | Fattal |
| 10,928,564 | B2 | 2/2021 | Fattal |
| 10,928,677 | B2* | 2/2021 | Aieta ................ G02B 6/0033 |
| 10,969,627 | B2 | 4/2021 | Fattal et al. |
| 11,004,407 | B2 | 5/2021 | Fattal et al. |
| 11,016,235 | B2 | 5/2021 | Fattal et al. |
| 11,041,988 | B2 | 6/2021 | Fattal et al. |
| 11,048,036 | B2 | 6/2021 | Ma et al. |
| 11,143,810 | B2 | 10/2021 | Fattal et al. |
| 11,143,811 | B2 | 10/2021 | Fattal et al. |
| 11,307,344 | B2 | 4/2022 | Fattal et al. |
| 2009/0322986 | A1 | 12/2009 | Wei et al. |
| 2012/0200807 | A1 | 8/2012 | Wei et al. |
| 2013/0169518 | A1 | 7/2013 | Wu et al. |
| 2014/0300840 | A1 | 10/2014 | Fattal et al. |
| 2015/0355403 | A1* | 12/2015 | Santori ............... G02B 5/1819 |
| | | | 362/606 |
| 2017/0329149 | A1 | 11/2017 | Fattal |
| 2017/0363794 | A1 | 12/2017 | Wan et al. |
| 2018/0299608 | A1* | 10/2018 | Fattal ................. G02B 30/33 |
| 2019/0018186 | A1 | 1/2019 | Fattal |
| 2019/0025494 | A1 | 1/2019 | Fattal et al. |
| 2019/0155105 | A1 | 5/2019 | Aieta et al. |
| 2019/0227335 | A1* | 7/2019 | Fattal ................. G02B 5/1819 |
| 2020/0005718 | A1 | 1/2020 | Fattal |
| 2020/0012034 | A1* | 1/2020 | Fattal ................. G02B 30/33 |
| 2020/0018886 | A1 | 1/2020 | Fattal et al. |
| 2020/0033621 | A1 | 1/2020 | Fattal et al. |
| 2020/0150489 | A1* | 5/2020 | Ma .................... G02B 6/0051 |
| 2020/0241295 | A1 | 7/2020 | Fattal |
| 2020/0301165 | A1 | 9/2020 | Fattal |
| 2020/0310115 | A1 | 10/2020 | Fattal |
| 2020/0310135 | A1 | 10/2020 | Fattal |
| 2021/0157050 | A1 | 5/2021 | Fattal |
| 2021/0390914 | A1 | 12/2021 | Fattal |
| 2021/0407438 | A1 | 12/2021 | Fattal |
| 2022/0044644 | A1 | 2/2022 | Fattal |

FOREIGN PATENT DOCUMENTS

| | | | |
|---|---|---|---|
| CN | 108027532 | | 5/2018 |
| CN | 108885309 | | 11/2018 |
| CN | 109100887 | | 12/2018 |
| CN | 109844406 | | 6/2019 |
| CN | 110140010 | | 8/2019 |
| CN | 110214287 | | 9/2019 |
| CN | 114556017 | A | 5/2022 |
| EP | 4045845 | A1 | 8/2022 |
| JP | H07287192 | | 10/1995 |
| JP | 2013205513 | A * | 10/2013 |
| JP | 2018503230 | | 2/2018 |
| JP | 2022552535 | A | 12/2022 |
| KR | 20220049594 | | 4/2022 |
| WO | 2012038856 | A1 | 3/2012 |
| WO | 2016111708 | | 7/2016 |
| WO | WO-2017131807 | A1 * | 8/2017 ......... G02B 27/4205 |
| WO | WO-2018037381 | A1 | 3/2018 |
| WO | WO-2018067381 | A1 * | 4/2018 ........... G02B 27/225 |
| WO | WO-2018182991 | A1 | 10/2018 |
| WO | 2021076113 | | 4/2021 |
| WO | 2021076114 | A1 | 4/2021 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

"Korean Application Serial No. 10-2022-7009596, Notice of Preliminary Rejection mailed Jan. 12, 2024", w English Translation, 12 pgs.

"International Application Serial No. PCT US2019 056401, International Preliminary Report on Patentability mailed Apr. 28, 2022", 8 pgs.

"Chinese Application Serial No. 201980101351.2, Office Action mailed Jan. 15, 2024", w English Translation, 31 pgs.

"Korean Application Serial No. 10-2022-7009596, Response filed Mar. 14, 2024 to Notice of Preliminary Rejection mailed Jan. 12, 2024", w English Claims, 19 pgs.

"Canadian Application Serial No. 3,154,377, Examiners Rule 86(2) Report mailed May 26, 2023", 3 pgs.

"Canadian Application Serial No. 3,154,377, Response filed Sep. 20, 2023 to Examiners Rule 86(2) Report mailed May 26, 2023", 8 pgs.

"Canadian Application Serial No. 3,154,377, Voluntary Amendment filed Mar. 11, 2022", 37 pgs.

"European Application Serial No. 19949231.5, Extended European Search Report mailed Jun. 12, 2023", 10 pgs.

"European Application Serial No. 19949231.5, Response filed Dec. 21, 2023 to Extended European Search Report mailed Jun. 12, 2023", 13 pgs.

"European Application Serial No. 19949231.5, Response to Communication pursuant to Rules 161(2) and 162 EPC filed Nov. 7, 2022", 24 pgs.

"Japanese Application Serial No. 2022-522759, Decision of Rejection mailed Sep. 21, 2023", W/English Translation, 6 pgs.

"Japanese Application Serial No. 2022-522759, Notification of Reasons for Rejection mailed Feb. 24, 2023", W/English Translation, 19 pgs.

(56) References Cited

OTHER PUBLICATIONS

"Japanese Application Serial No. 2022-522759, Response filed Jan. 26, 2024 to Decision of Rejection mailed Sep. 21, 2023", W/English Claims, 7 pgs.

* cited by examiner

MULTIBEAM BACKLIGHT, MULTIVIEW DISPLAY, AND METHOD WITH DIFFRACTION GRATING FILLING FRACTION

CROSS-REFERENCE TO RELATED APPLICATIONS

This application is a continuation patent application of and claims priority to International Patent Application No. PCT/US2019/056401, filed Oct. 15, 2019, the contents of which are incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide backlighting that provides diffractive efficiency control of a diffraction grating using a filling fraction of diffractive features, with application to electronic displays. In various embodiments consistent with the principles herein, a multibeam backlight employing a plurality of multibeam elements having a diffraction grating configured to provide directional light beams is provided. The diffraction grating comprises diffractive features and filling features in various embodiments. The filling features are positioned and oriented to interrupt the diffractive features to establish the filling fraction as a ratio of an area of the diffractive features relative to an area of the filling features within the diffraction grating. The filling fraction controls a diffractive efficiency of the diffraction grating. Uses of the backlighting and various backlit displays described herein may include, but are not limited to, mobile telephones (e.g., smart phones), watches, tablet computers, mobile computers (e.g., laptop computers), personal computers and computer monitors, automobile display consoles, cameras displays, and various other mobile as well as substantially non-mobile display applications and devices.

Figure 1A:
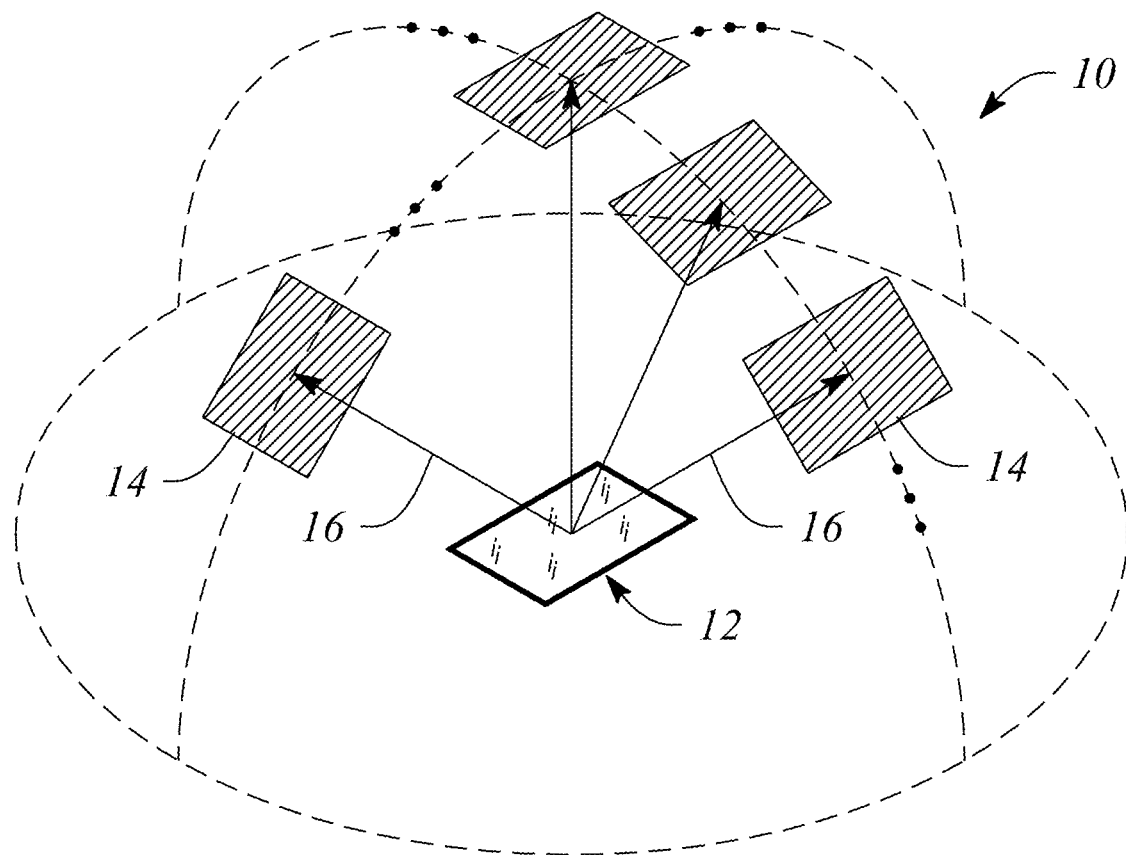
FIG. 1A illustrates a perspective view of a multiview display in an example, according to an embodiment consistent with the principles described herein.

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \varphi\}$, by definition herein. The angular component $\theta$ is referred to herein as the 'elevation component' or 'elevation angle' of the light beam. The angular component $\varphi$ is referred to as the 'azimuth component' or 'azimuth angle' of the light beam. By definition, the elevation angle $\theta$ is an angle in a vertical plane (e.g., perpendicular to a plane of the multiview display screen) while the azimuth angle $\varphi$ is an angle in a horizontal plane (e.g., parallel to the multiview display screen plane).

Figure 1B:
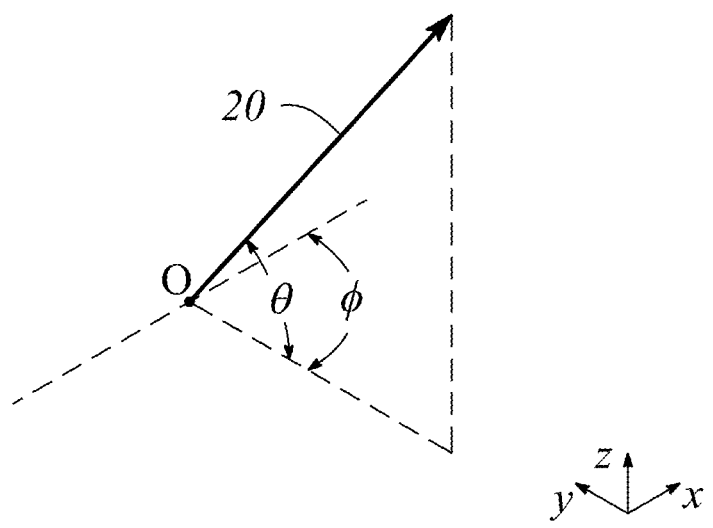
FIG. 1B illustrates a graphical representation of the angular components of a light beam having a particular principal angular direction corresponding to a view direction of a multiview display in an example, according to an embodiment consistent with the principles described herein.

FIG. 1B illustrates a graphical representation of the angular components $\{\theta, \varphi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

By definition herein, a 'multibeam element' is a structure or element of a backlight or a display that produces light that includes a plurality of directional light beams. Directional light beams of the plurality of directional light beams (or 'directional light beam plurality') produced by a multibeam element have different principal angular directions from one another, by definition herein. In particular, by definition, a directional light beam of the directional light beam plurality has a predetermined principal angular direction that is different from another directional light beam of the directional light beam plurality. According to some embodiments, a size of the multibeam element may be comparable to a size of a light valve used in a display that is associated with the multibeam element (e.g., a multiview display). In particular, the multibeam element size may be between about one half and about two times the light valve size, in some embodiments. In some embodiments, a multibeam element may provide polarization-selective scattering.

According to various embodiments, the directional light beam plurality may represent a light field. For example, the directional light beam plurality may be confined to a substantially conical region of space or have a predetermined angular spread that includes the different principal angular directions of the light beams in the light beam plurality. As such, the predetermined angular spread of the directional light beams in combination (i.e., the directional light beam plurality) may represent the light field.

According to various embodiments, the different principal angular directions of the various directional light beams in the directional light beam plurality are determined by a characteristic including, but not limited to, a size (e.g., one or more of length, width, area, and etc.) of the multibeam element along with other characteristics. For example, in a diffractive multibeam element, a 'grating pitch' or a diffractive feature spacing and an orientation of a diffraction grating within diffractive multibeam element may be characteristics that determine, at least in part, the different principal angular directions of the various directional light beams. In some embodiments, the multibeam element may be considered an 'extended point light source', i.e., a plurality of point light sources distributed across an extent of the multibeam element, by definition herein. Further, a directional light beam produced by the multibeam element may have a principal angular direction given by angular components $\{\theta, \varphi\}$, as described below with respect to FIG. 1B.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

In some embodiments, the light guide may be substantially flat (i.e., confined to a plane) and therefore, the light guide is a planar or plate light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. In other examples, the diffraction grating may be a mixed-period diffraction grating that includes a plurality of diffraction gratings, each diffraction grating of the plurality having a different periodic arrangement of features. Further, the diffraction grating may include a plurality of diffractive features (e.g., a plurality of grooves or ridges in a material surface) arranged in a one-dimensional (1D) array. In other examples, the diffraction grating may be a two-dimensional (2D) array of diffractive features. The diffraction grating may be a 2D array of bumps on or holes in a material surface, for example. In some examples, the diffraction grating may be substantially periodic in a first direction or dimension and substantially aperiodic (e.g., constant, random, etc.) in another direction across or along the diffraction grating.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' or 'diffractive scattering' in that the diffraction grating may couple or scatter light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a top surface or bottom surface of a light guide, for example. In other examples, the surface may be internal to the light guide. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element, as described below) may be employed to diffractively scatter or couple light out of a light guide (e.g., a plate light guide) as a light beam. In particular, a diffraction angle of or provided by a locally periodic diffraction grating may be given by equation (1) as:

$$\theta_m = \sin^{-1}\left(n \sin \theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
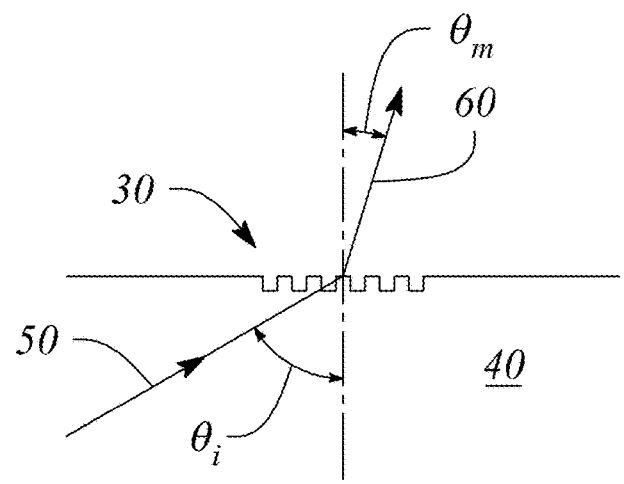
FIG. 2 illustrates a cross-sectional view of a diffraction grating in an example, according to an embodiment consistent with the principles described herein.

FIG. 2 illustrates a cross sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The light beam 50 is a guided light beam within the light guide 40. Also illustrated in FIG. 2 is a directional light beam 60 diffractively produced and coupled-out by the diffraction grating 30 as a result of diffraction of the incident light beam 50. The directional light beam 60 has a diffraction angle $\theta_m$ (or 'principal angular direction' herein) as given by equation (1). The diffraction angle $\theta_m$ may correspond to a diffraction order 'm' of the diffraction grating 30, for example. Further, the diffractive features may be curved and may also have a predetermined orientation (e.g., a slant or a rotation) relative to a propagation direction of light, according to some embodiments. One or both of the curve of the diffractive features and the orientation of the diffractive features may be configured to control a direction of light coupled-out by the diffraction grating, for example. For example, a principal angular direction of the directional light may be a function of an angle of the diffractive feature at a point at which the light is incident on the diffraction grating relative to a propagation direction of the incident light.

Herein a 'collimator' is defined as substantially any optical device or apparatus that is configured to collimate light. For example, a collimator may include, but is not limited to, a collimating mirror or reflector, a collimating lens, a diffraction grating, or various combinations thereof. Herein, a 'collimation factor,' denoted $\sigma$, is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., +/−$\sigma$ degrees about a central or principal angular direction of the collimated light beam). The light rays of the collimated light beam may have a Gaussian distribution in terms of angle and the angular spread may be an angle determined at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

By definition, 'broad-angle' emitted light is defined as light having a cone angle that is greater than a cone angle of the view of a multiview image or multiview display. In particular, in some embodiments, the broad-angle emitted light may have a cone angle that is greater than about twenty degrees (e.g., $>\pm 20°$). In other embodiments, the broad-angle emitted light cone angle may be greater than about thirty degrees (e.g., $>\pm 30°$), or greater than about forty degrees (e.g., $>\pm 40°$), or greater than about fifty degrees (e.g., $>\pm 50°$). For example, the cone angle of the broad-angle emitted light may be greater than about sixty degrees (e.g., $>\pm 60°$).

In some embodiments, the broad-angle emitted light cone angle may defined to be about the same as a viewing angle of an LCD computer monitor, an LCD tablet, an LCD television, or a similar digital display device meant for broad-angle viewing (e.g., about $\pm 40$-$65°$). In other embodiments, broad-angle emitted light may also be characterized or described as diffuse light, substantially diffuse light, non-directional light (i.e., lacking any specific or defined directionality), or as light having a single or substantially uniform direction.

Further, as used herein, the article 'a' is intended to have its ordinary meaning in the patent arts, namely 'one or more'. For example, 'a diffraction grating' means one or more diffraction grating and as such, 'the diffraction grating' means 'diffraction grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
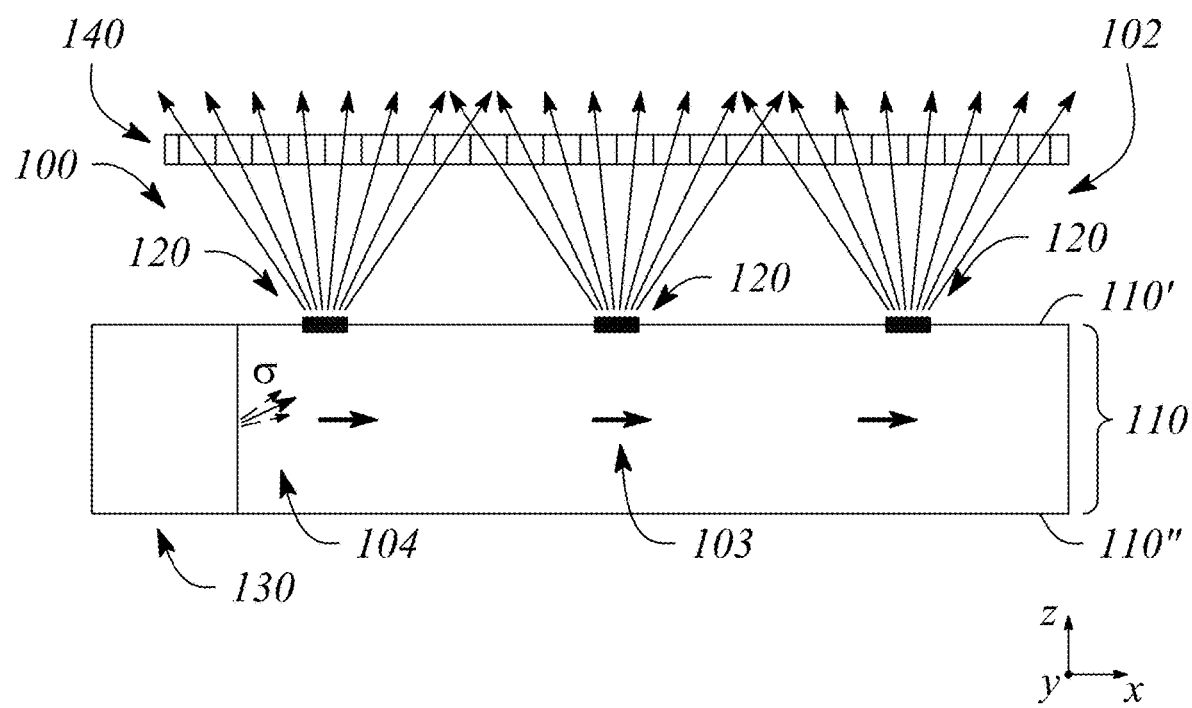
FIG. 3A illustrates a cross-sectional view of a multibeam backlight in an example, according an embodiment consistent with the principles described herein.
Figure 3B:
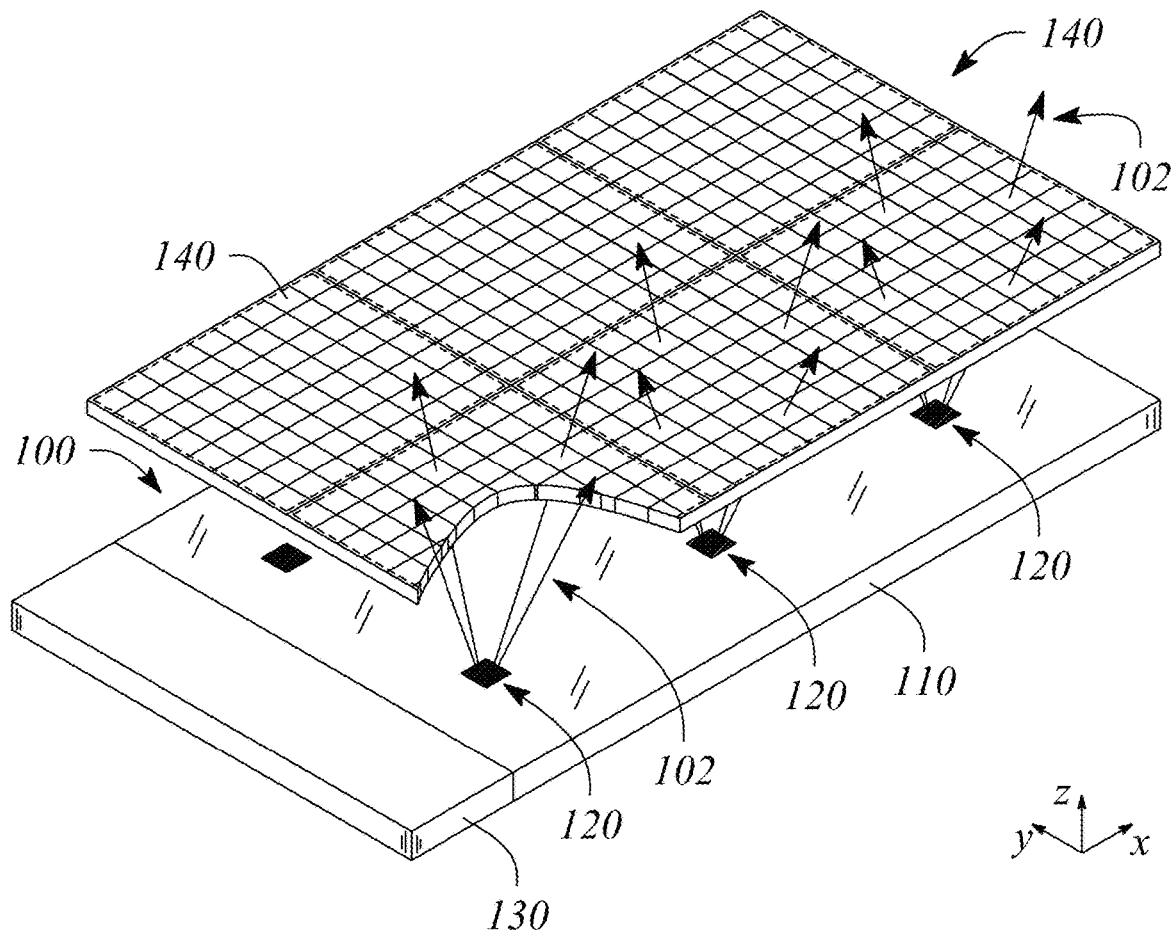
FIG. 3B illustrates a perspective view of a multibeam backlight in an example, according an embodiment consistent with the principles described herein.

According to some embodiments of the principles described herein, a multibeam backlight is provided. FIG. 3A illustrates a cross sectional view of a multibeam backlight 100 in an example, according to an embodiment consistent with the principles described herein. FIG. 3B illustrates a perspective view of the multibeam backlight 100 in an example, according to an embodiment consistent with the principles described herein. The perspective view in FIG. 3B is illustrated with a partial cut-away to facilitate discussion herein.

As illustrated, the multibeam backlight 100 comprises a light guide 110. The light guide 110 is configured to guide light along a length of the light guide as guided light 104 (i.e., a guided light beam 104). For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In some embodiments, the light guide 110 may be a slab or plate of an optical waveguide (i.e., a plate light guide) comprising an extended, substantially planar sheet of optically transparent, dielectric material. The substantially planar sheet of dielectric material is configured to guide the guided light 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the first surface and the second surface) of the light guide 110. The cladding layer may be used to further facilitate total internal reflection, according to some examples.

Further, according to some embodiments, the light guide 110 may be configured to guide the guided light 104 according to total internal reflection at a non-zero propagation angle between a first surface 110' (e.g., front or top surface or side) and a second surface 110" (e.g., back or bottom surface or side) of the light guide 110. In particular, the guided light 104 propagates by reflecting or 'bouncing' between the first surface 110' and the second surface 110" of the light guide 110 at the non-zero propagation angle. In some embodiments, a plurality of guided light beams 104 comprising different colors of light may be guided by the light guide 110 at respective ones of different color-specific, non-zero propagation angles. Note, the non-zero propagation angle is not illustrated in FIG. 3A for simplicity of illustration. However, a bold arrow depicting a propagation direction 103 illustrates a general propagation direction of the guided light 104 along the light guide length (e.g., in an x-direction) in FIG. 3A.

As illustrated in FIGS. 3A-3B, the multibeam backlight 100 further comprises a plurality of multibeam elements 120 spaced apart from one another along the light guide length. In particular, the multibeam elements 120 of the multibeam element plurality are separated from one another by a finite space and represent individual, distinct elements along the light guide length. That is, by definition herein, the multibeam elements 120 of the multibeam element plurality are spaced apart from one another according to a finite (i.e., non-zero) inter-element distance (e.g., a finite center-to-center distance). Further, the multibeam elements 120 of the multibeam element plurality generally do not intersect, overlap or otherwise touch one another, according to some embodiments. That is, each multibeam element 120 of the multibeam element plurality is generally distinct and separated from other ones of the multibeam elements 120.

According to some embodiments, the multibeam elements 120 of the multibeam element plurality may be arranged in either a one-dimensional (1D) array or a two-dimensional (2D) array. For example, the multibeam elements 120 may be arranged as a linear 1D array. In another example, the multibeam elements 120 may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the multibeam elements 120 may be substantially uniform or constant across the array. In other examples, the inter-element distance between the multibeam elements 120 may be varied one or both of across the array and along the length of the light guide 110.

According to various embodiments, a multibeam element 120 of the multibeam element plurality comprises a diffraction grating configured to diffractively scatter a portion of the guided light 104 out of the light guide 110 as directional light beams 102. As such, the multibeam element 120 may be referred to as a 'diffractive multibeam element.' The directional light beams 102 scattered out by the multibeam element 120 have different directions corresponding to different view directions of a multiview display associated with the multibeam backlight 100, according to various embodiments. FIGS. 3A and 3B illustrate the directional light beams 102 as a plurality of diverging arrows depicted as being directed way from the first (or front) surface 110' of the light guide 110. Light emitted by the multibeam backlight 100 as emitted light comprises the directional light beams 102 that are diffractively scattered out by the multibeam elements 120.

According to various embodiments, a filling fraction of diffractive features within the diffraction grating is configured to control a diffractive scattering efficiency of the multibeam element 120. Herein, a 'filling fraction' is defined as a percentage of an area of the diffraction grating that is filled with diffractive features. Equivalently, the 'filling fraction' may also be defined as a ratio of the area that includes diffractive features to an area that does not include diffractive features. For example, in some embodiments (described below), the diffraction grating may comprise filling features that interrupt the diffractive features. Accordingly, the 'filling fraction' may also be defined as a percentage of the diffraction grating area that includes of diffractive features as opposed to filling features, or equivalently, a ratio of the area that includes of diffractive features to an area that comprises filling features.

Figure 4A:
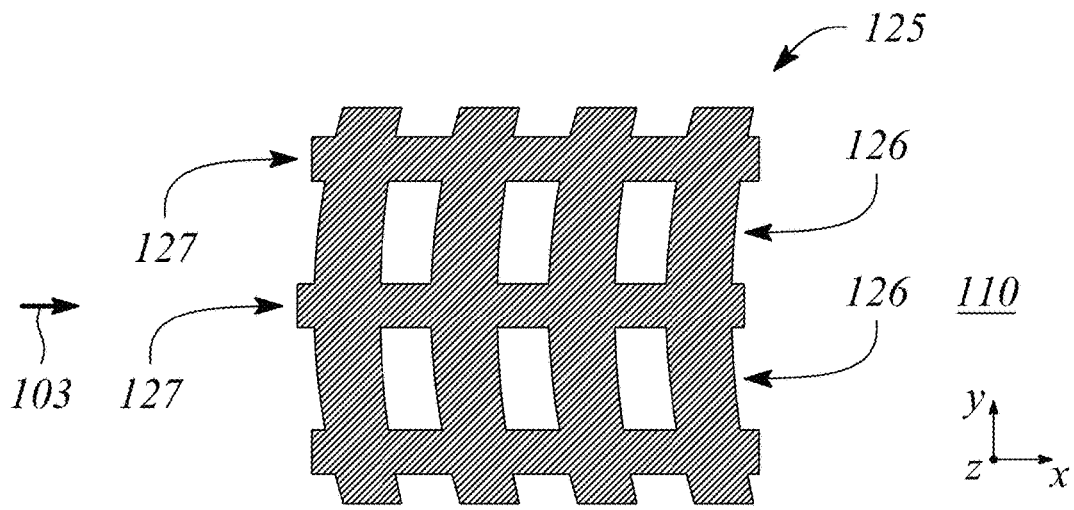
FIG. 4A illustrates a plan view of a diffraction grating having a filling fraction in an example, according to an embodiment consistent with the principles described herein.

FIG. 4A illustrates a plan view of a diffraction grating 125 having a filling fraction in an example, according to an embodiment consistent with the principles described herein. In particular, the diffraction grating 125 may be a diffraction grating of a multibeam element 120 of the multibeam backlight 100. As illustrated, the diffraction grating 125 comprises diffractive features 126. The diffractive features 126 are configured to diffractively redirect light incident on the diffraction grating 125 and may diffractively scatter light out of the light guide 110 by diffraction when the diffraction grating 125 is incorporated in a multibeam element 120, according to various embodiments.

The diffraction grating 125 illustrated in FIG. 4A further comprises filling features 127 configured to provide a filling fraction of the diffraction features 126 or equivalently of the diffraction grating 125. According to various embodiments, the filling features 127 are configured to be optically inert to light incident on the diffraction grating 125 along the propagation direction of the guided light (e.g., guided light 104). As such, the filling features 127 may provide little to no diffraction of the incident guided light. The filling fraction of the diffractive features 126 of FIG. 4A is the percentage of the diffraction grating 125 occupied by the diffractive features 126, or the ratio of the diffraction features 126 to filling features 127.

Figure 4B:
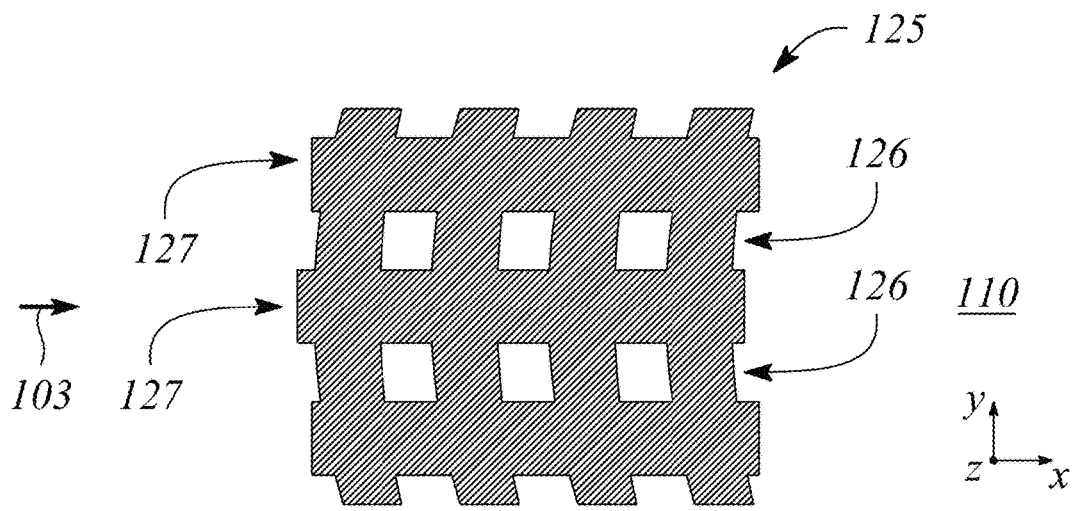
FIG. 4B illustrates a plan view of another diffraction grating having a filling fraction in an example, according to an embodiment consistent with the principles described herein.

FIG. 4B illustrates a plan view of another diffraction grating 125 having a filling fraction in an example, according to an embodiment consistent with the principles described herein. Again, the diffraction grating 125 illustrated in FIG. 4B may be a diffraction grating of a multibeam element 120 of the multibeam backlight 100, in some embodiments. As illustrated in FIG. 4B, the diffraction grating 125 comprises both diffractive features 126 and filling features 127 configured to provide the filling fraction. Further, an area occupied by the diffractive features 126 relative to an area having the filling features 127 is smaller than that of the diffraction grating 125 illustrated in FIG. 4A. As a result, the filling fraction of the diffraction grating 125 of FIG. 4B is less than that of FIG. 4A. With a lower filling fraction, the diffraction grating 125 of FIG. 4B may have a lower diffractive efficiency, or equivalently, may provide less diffraction of light incident on the diffraction grating 125 per unit area than the diffraction grating 125 of FIG. 4A, for example.

Figure 4C:
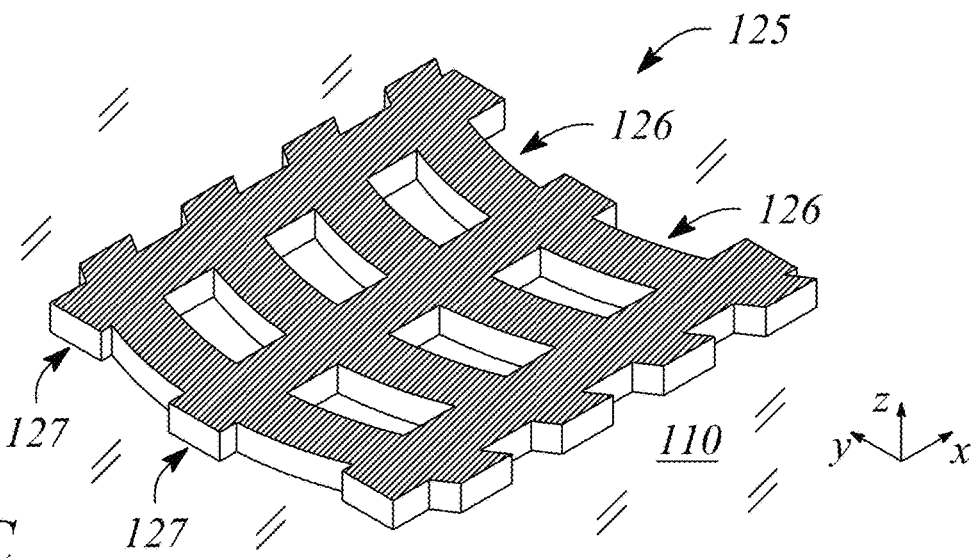
FIG. 4C illustrates a perspective view of a diffraction grating having a filling fraction in an example, according to an embodiment consistent with the principles described herein.

FIG. 4C illustrates a perspective view of a diffraction grating 125 having a filling fraction in an example, according to an embodiment consistent with the principles described herein. For example, the diffraction grating 125 illustrated in FIG. 4C may represent a perspective view of the diffraction grating 125 illustrated in FIG. 4A. In particular, the diffraction grating 125 of FIG. 4C has both diffractive features 126 and filling features 127. Further, the diffraction grating 125 is located on a surface of the light guide 110, as illustrated.

In some embodiments, the diffractive features 126 of the diffraction grating 125 have an orientation that is orthogonal to or at least substantially orthogonal to a propagation direction of the guided light. Referring to FIGS. 4A-4C, the diffractive features 126 are depicted as being generally oriented along ay-direction and orthogonal to the propagation direction 103 of the guided light 104 (as shown by an arrow), which is illustrated in the x-direction. Further, the filling features 127 of the diffraction gratings 125 illustrated in FIGS. 4A-4C have an orientation parallel to or substantially parallel to the propagation direction 103 and thus are oriented along the x-direction in the embodiments illustrated in FIGS. 4A-4C. As a result, the filling features 127 intersect and interrupt the diffractive features 126 of the diffraction grating 125 to establish the filling fraction of the diffraction grating 125, as illustrated.

In some embodiments, both the diffractive features 126 and filling features 127 of the diffraction grating 125 may comprise ridges on a surface of the light guide 110. In other embodiments, both the diffractive features 126 and the filling features 127 of the diffraction grating 125 may comprise grooves in the light guide surface.

For example, FIGS. 4A-4C illustrate the diffractive features 126 and filling features 127 as ridges on the surface of the light guide 110, where the ridges are depicted using a crosshatched area in FIGS. 4A and 4B, for example. As illustrated, the filling features 127 are oriented to intercept and interrupt the diffractive features 126, as previously described, at an intersection between a ridge of a diffractive feature 126 and a ridge of a filling feature 127. In particular, the intersection between the diffractive feature 126 and the filling feature 127 is configured to introduce a gap in the diffractive feature 126 that interrupts the diffractive feature 126. The gap in the ridge of the diffractive feature 126 represents a reduction of an area or length of diffractive features 126 that reduces the diffractive efficiency of the diffraction grating 125 according to the filling fraction.

Figure 5A:
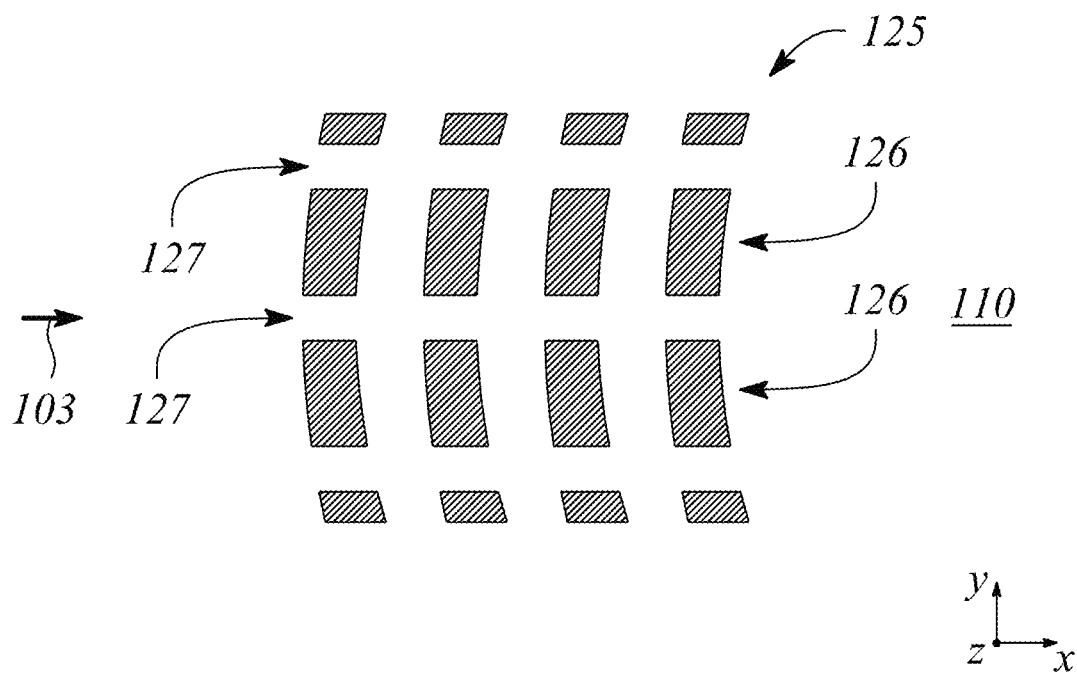
FIG. 5A illustrates a plan view of a diffraction grating having a filling fraction in an example, according to an embodiment consistent with the principles described herein.
Figure 5B:
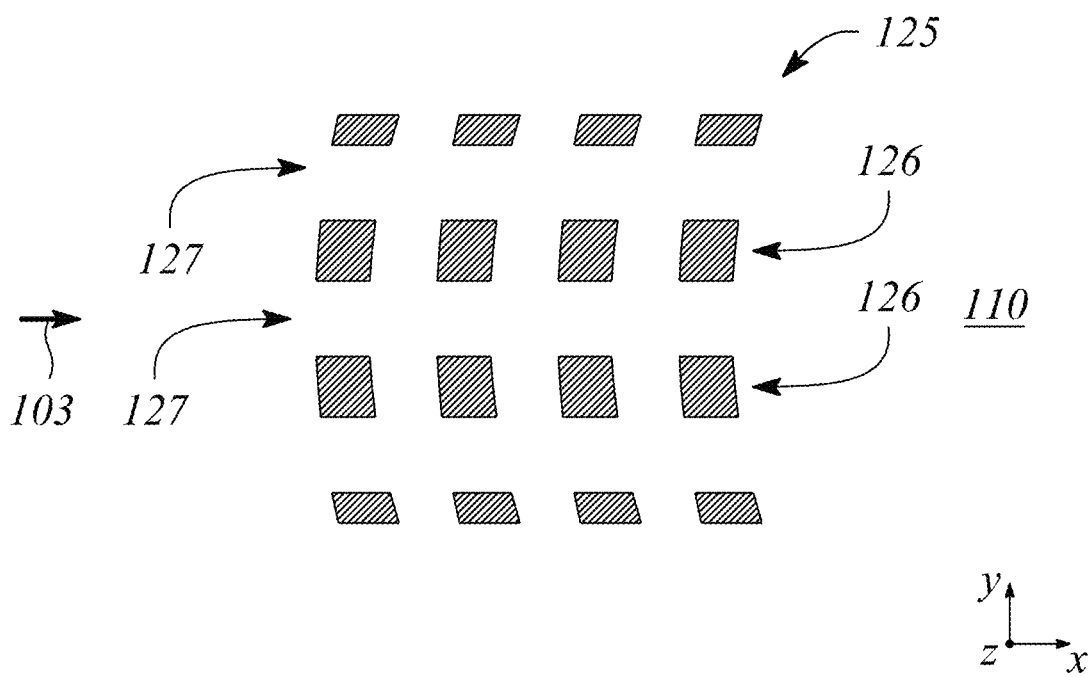
FIG. 5B illustrates a plan view of a diffraction grating having a filling fraction in an example, according to another embodiment consistent with the principles described herein.

FIG. 5A illustrates a diffraction grating 125 having a filling fraction in an example, according to another embodiment consistent with the principles described herein. FIG. 5B illustrates a diffraction grating 125 having a filling fraction in an example, according to another embodiment consistent with the principles described herein. In particular, in FIGS. 5A and 5B, diffractive features 126 and filling features 127 of the diffraction grating 125 comprise grooves in the light guide surface. As with ridges of FIGS. 4A-4C, the grooves representing the diffractive features 126 illustrated in FIGS. 5A-5B are oriented orthogonal to the propagation direction 103 of the guided light 104, while grooves representing the filling features 127 are oriented parallel to the propagation direction 103 of the guided light 104. Also, as was the case in FIGS. 4A-4C, the grooves of the filling features 127 illustrated in FIGS. 5A-5B are configured to intersect and interrupt the grooves representing the diffractive features 126 of the diffraction grating 125. In particular, an intersection between a groove of the diffractive features 126 and a groove of the filling features 127 illustrated in FIGS. 5A-5B is configured to introduce a gap in the diffractive feature 126 that interrupts the diffractive feature 126. The gap in the groove of the diffractive features 126 represents a reduction of a length or an area of diffractive features 126 that diminishes the diffractive efficiency of the diffraction grating 125, accordingly.

In some embodiments, the filling fraction may be configured to increase as a function of distance along the length of the light guide 110. The increase in the filling fraction may provide a corresponding increase in diffractive scattering efficiency of multibeam elements 120 of the multibeam element plurality. The increase in diffractive scattering efficiency may be configured to compensate for a concomitant reduction in an intensity of guided light within the light guide 110 along the light guide length, in some embodiments. In other embodiments, the filling fraction of the diffractive features 126 may be configured to follow other functions of distance. For example, the filling fraction may be configured to decrease as a function of distance along the light guide length. In some embodiments, the filling fraction may be configured to increase up to the certain point of the light guide length, and then decrease for the remainder of the light guide length. The filling fraction may also be configured to vary along the light guide length various functions of distance. For example, the filling fraction may have configured to vary linearly, logarithmically, or vary as a sinusoidal wave as a function of the light guide length.

In some embodiments, the diffraction grating 125 may further comprise a reflective material layer, or more particularly, a reflective island comprising a reflective material or reflective material layer. A reflective material of the reflective material layer or reflective island may comprise substantially any reflective material or reflective material layer including, but not limited to, a reflective metal (e.g., aluminum, silver, gold, etc.) or a reflective polymer (e.g., an aluminum polymer composite) as well as various reflective films, e.g., an enhanced specular reflector (ESR) film such as Vikuiti™ ESR, manufactured by 3M corporation, St. Paul, Minnesota. In some embodiments, the filling fraction may be either provided or augmented by the reflective material layer or reflective island.

Figure 6A:
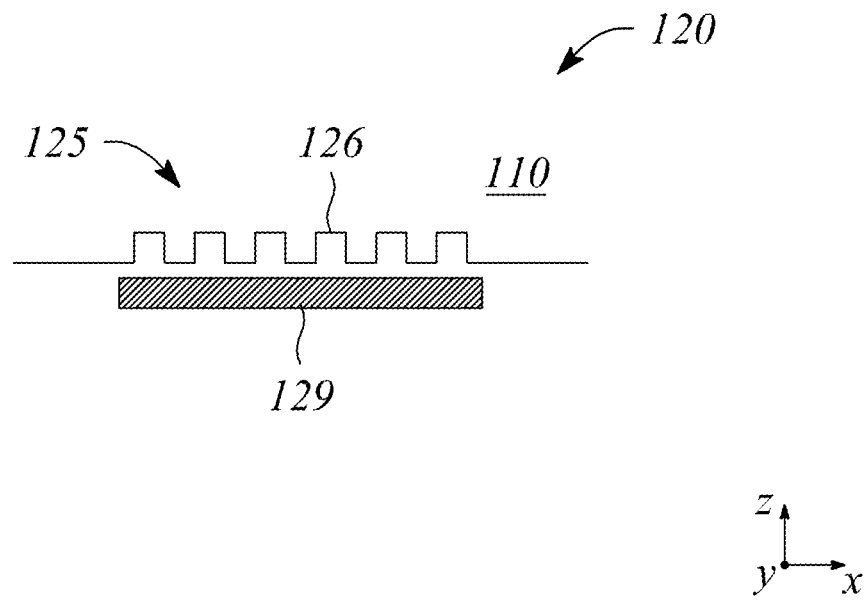
FIG. 6A illustrates a cross sectional view of a multibeam element having a reflective island in an example, according to an embodiment consistent with the principles described herein.
Figure 6B:
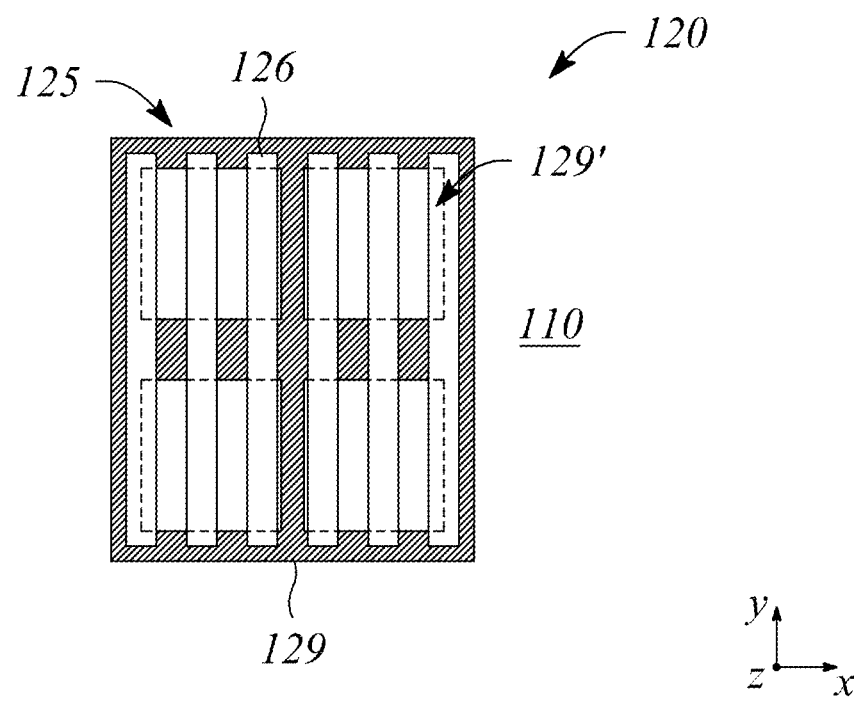
FIG. 6B illustrates a plan view of a multibeam element having a reflective island in an example, according to another embodiment of the principles described herein.

FIG. 6A illustrates a cross sectional view of a multibeam element 120 having a reflective island 129 in an example, according to an embodiment consistent with the principles described herein. FIG. 6B illustrates a plan view of a multibeam element 120 having a reflective island 129 in an example, according to another embodiment of the principles described herein. In particular, the multibeam element 120 illustrated in FIGS. 6A-6B comprises a diffraction grating 125 at a surface of the light guide 110 and a reflective island 129 adjacent to the light guide surface. Also illustrated are diffractive features 126 of the diffraction grating 125, by way of example and not limitation. According to various embodiments, the reflective island 129 of the multibeam element 120 comprises a reflective material or reflective material layer and is configured to redirect a portion of the diffractively scattered light in a direction of the directional light beams 102. In some embodiments, the reflective island 129 may have an extent corresponding to an extent of the diffraction grating 125.

As illustrated in FIG. 6B, the reflective island 129 may comprise openings 129' in a reflective material of the reflective island 129. A ratio of an area of the reflective island 129 to an area of the openings 129' within the diffraction grating 125 may define or correspond to the filling fraction, in some embodiments. For example, as illustrated FIG. 6B, the filling fraction of the diffraction grating 125 may be about fifty percent (50%). Correspondingly, a ratio of an area of the reflective material to an area of the openings 129' within the diffraction grating 125 is about 50% (e.g., equivalently, the reflective island 129 covers about half of the multibeam element 120). In other embodiments (not illustrated), the reflective material may reside within the ridges or grooves that provide the diffractive features and filling features of the diffraction grating 125. The reflective material being within the grooves or ridges may enhance a performance of the diffractive features, for example.

Referring back to FIG. 3A, the multibeam backlight 100 may further comprise a light source 130. According to various embodiments, the light source 130 is configured to provide the light to be guided within light guide 110. In particular, the light source 130 may be located adjacent to an entrance surface or end (input end) of the light guide 110. In various embodiments, the light source 130 may comprise substantially any source of light (e.g., optical emitter) including, but not limited to, one or more light emitting diodes (LEDs) or a laser (e.g., laser diode). In some embodiments, the light source 130 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 130 may be a substantially broadband light source configured to provide substantially broadband or polychromatic light. For example, the light source 130 may provide white light. In some embodiments, the light source 130 may comprise a plurality of different optical emitters configured to provide different colors of light. The different optical emitters may be configured to provide light having different, color-specific, non-zero propagation angles of the guided light corresponding to each of the different colors of light.

In some embodiments comprising a light source 130 as described above, the filling fraction of diffractive features of the diffraction grating 125 may be configured to control the diffractive scattering efficiency of the multibeam element as a function of a distance from the light source 130 along the light guide 110. For example, the filling fraction may be configured to increase as a function of distance from the light source 130 along the length of the light guide 110, the increase in the filling fraction providing a corresponding increase in diffractive scattering efficiency of multibeam elements 120 of the multibeam element plurality to compensate for a reduction in an intensity of guided light within the light guide along the light guide length, in some embodiments.

FIG. 3A further illustrates an array of light valves 140. As illustrated, the array of light valves 140 is configured to modulate the directional light beams 102 of the directional light beam plurality. In various embodiments, different types of light valves may be employed as the light valves 140 of the light valve array including, but not limited to, one or more of liquid crystal light valves, electrophoretic light valves, and light valves based on electrowetting.

The array of light valves 140 may be part of a multiview display that employs the multibeam backlight 100, for example, and is illustrated in FIGS. 3A and 3B along with the multibeam backlight 100 for the purpose of facilitating discussion herein. As such, principal angular directions of the directional light beams 102 correspond to view directions of the multiview display. Further, in some embodiments a size of the multibeam element 120 may be between about twenty-five percent (25%) and about two hundred percent (200%) of a size of a light valve 140 of the light valve array. In other embodiments, the multibeam element size may be between about fifty percent (50%) and about one hundred fifty percent (150%) of the light valve size. For example, the multibeam element size and the light valve size may be substantially equal in size.

Figure 7:
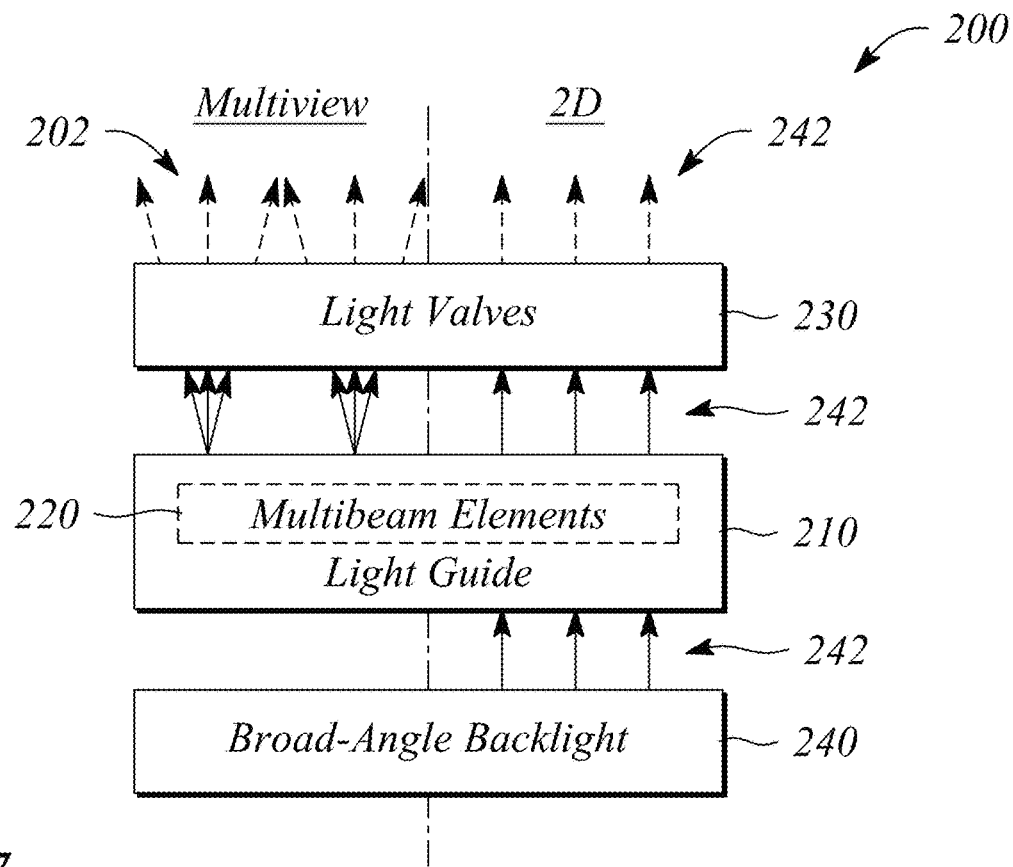
FIG. 7 illustrates a block diagram of a multiview display in an example, according to an embodiment consistent with the principles described herein.

In accordance with some embodiments of the principles described herein, a multiview display is provided. FIG. 7 illustrates a block diagram of a multiview display 200 in an example, according to an embodiment consistent with the principles described herein. As illustrated, the multiview display 200 comprises a light guide 210 configured to guide light along the light guide. In some embodiments, the light guide 210 may be substantially similar to the light guide 110 of the multibeam backlight 100, previously described. As such, the light guide 210 may be configured to guide the guided light using total internal reflection. Further, the guided light may be guided at a non-zero propagation angle by or within the light guide 210. In some embodiments, the guided light may be collimated or may be a collimated light beam. In particular, the guided light may be collimated according to or having a collimation factor σ, in some embodiments.

The multiview display 200 further comprises an array of multibeam elements 220 spaced apart from one another along the light guide 210. The array of multibeam elements 220 is configured to scatter out guided light from the light guide 210 as directional light beams 202 having directions corresponding to view directions of the multiview display 200. The multibeam elements 220 of the multibeam element array may be located on surface of or within the light guide 210, according to various embodiments. In some embodiments, a multibeam element 220 of the multibeam element array may be substantially similar to the multibeam element 120 of the multibeam backlight 100, described above. In particular, the multibeam element 220 of the multibeam element array comprises a diffraction grating having diffractive features and filling features.

The multiview display 200 further comprises an array of light valves 230. The array of light valves 230 is configured to modulate the directional light beams 202 to provide a multiview image. In some embodiments, the array of light valves 230 may be substantially similar to the array of light valves 140 described above with respect to the multibeam backlight 100. For example, the array of light valves 230 may employ any of a variety of different types of light valves including, but not limited to, one or more of liquid crystal light valves, electrophoretic light valves, and light valves based on electrowetting.

According to various embodiments, a filling fraction of the diffractive features relative to the filling features within the diffraction grating of the multibeam elements 220 is configured to control a diffractive scattering efficiency of the multibeam element 220. The filling fraction may be defined as a percentage of an area of the diffraction grating that is filled with diffractive features, or as a ratio of areas of diffractive features to areas of filling features within a diffraction grating. The diffractive efficiency of the multibeam element may increase concomitant with the filling fraction of the diffractive features, as described above with respect to the multibeam backlight 100.

In some embodiments, a size of the multibeam element 220 of the multibeam element array is comparable to a size of a light valve 230 of the light valve array. In some embodiments, the size of the multibeam emitter is comparable to the light valve size such that the multibeam element size is between about one quarter and about two times of the light valve size. In other embodiments, the multibeam element size may be between about fifty percent (50%) and about two hundred percent (200%) of the light valve size. The correspondence between the multibeam element size and the light valve size may be configured to minimize or even eliminate Moiré or similar effects, for example.

In some embodiments, the filling features are arranged within the diffraction grating of the multibeam element 220 parallel to a propagation direction of the guided light. In this orientation, the filling features are configured to intersect and interrupt the diffractive features of the diffraction grating to establish the filling fraction as a ratio of an area of the diffractive features relative to an area of the filling features within the diffraction grating, as previously described with respect to the multibeam backlight 100. In some embodiments, both the diffractive features and the filling features comprise one of grooves in a surface of the light guide 210 and ridges on the surface of the light guide 210.

In some embodiments, the multibeam element 220 of the multibeam element array further comprises a reflective material layer configured to reflect diffractively scattered light in a direction of the directional light beams 202. The reflective material layer may comprise a reflective material substantially similar to the reflective material described above with respect to the multibeam backlight 100. In some embodiments, the reflective material layer may be located in the grooves of the diffractive features and the filling features. In some embodiments, the reflective material layer may be located between the ridges of the diffractive features and the filling features. In some embodiments, the reflective material layer may comprise a reflective island and may include openings, as is described above.

As illustrated in FIG. 7, the multiview display 200 may further comprise a broad-angle backlight 240 adjacent to the light guide 210. The broad-angle backlight 240 illustrated FIG. 7 is adjacent to a side of the light guide 210 opposite to the light valve array. In particular, as illustrated, the broad-angle backlight 240 is adjacent to a bottom surface of the light guide 210. The broad-angle backlight 240 is configured to provide broad-angle light as broad-angle emitted light 242 during a two-dimensional (2D) mode of the multiview display 200. Further, the light valve array may be configured to modulate the broad-angle emitted light as a 2D image during the 2D mode.

According to some embodiments, the light guide 210 and the array of multibeam elements 220 may be configured to be optically transparent to the broad-angle emitted light 242 provided by the adjacent broad-angle backlight 240. Thus, broad-angle emitted light 242 may be configured to pass through a thickness of light guide 210. The broad-angle emitted light 242 from the broad-angle backlight 240 is therefore received through the bottom surface of the light guide 210, transmitted through a thickness of the light guide 210, and emitted from the array of light valves 230. Because the light guide 210 is optically transparent to the broad-angle light, the broad-angle emitted light 242 is not substantially affected by the light guide 210.

The multiview display 200 of FIG. 7 may selectively operate in either a two-dimensional (2D) mode or a multi-view mode. In the 2D mode, the multiview display 200 is configured to emit the broad-angle emitted light 242 provided by the broad-angle backlight 240. In the multiview mode, the multiview display 200 is configured to emit the directional light beams 202 provided by the light guide 210 and multibeam elements 220, as previously described. The combination of the light guide 210 and broad-angle backlight 240 may be used in mode switchable (2D/multiview) display, for example.

Figure 8:
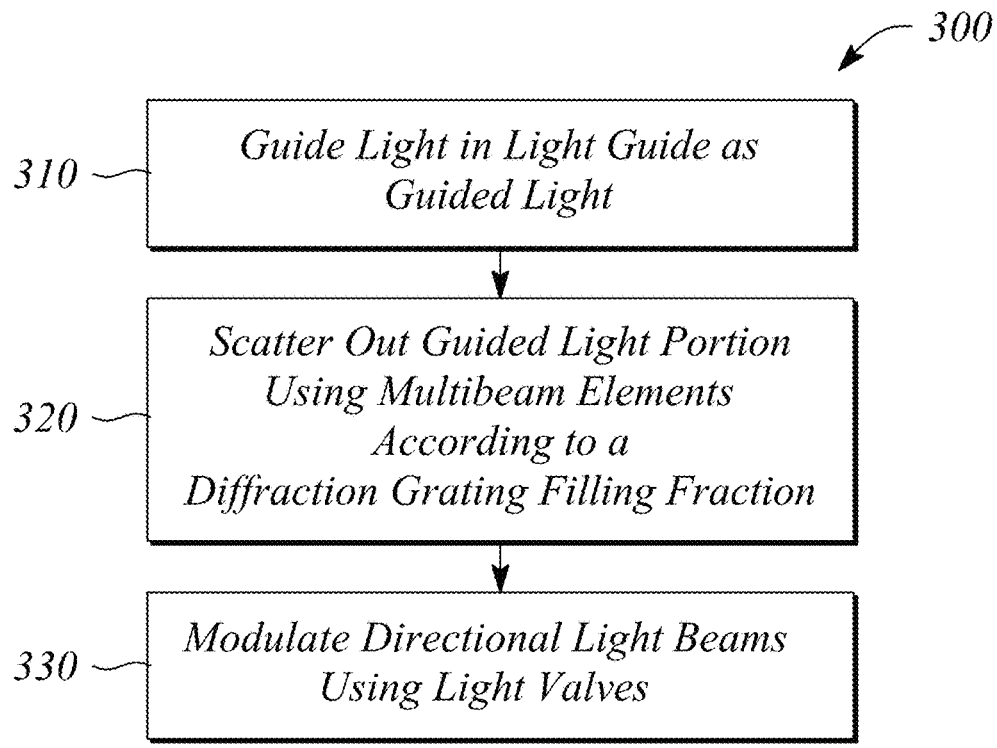
FIG. 8 illustrates a flowchart of a method of multiview display operation in an example, according to an embodiment consistent with the principles described herein.

According to some embodiments of the principles described herein, a method of multiview display operation is provided. FIG. 8 illustrates a flowchart of the method 300 of multiview display operation in an example, according to an embodiment consistent with the principles described herein. As illustrated, the method 300 comprises guiding 310 light along a light guide as guided light. In some embodiments, the light guide may be substantially similar to the light guide 110 described above with respect to the multibeam backlight 100. For example, the guided light is guided and propagates along the light guide using total internal reflection within the light guide. In some embodiments, the guided light may be guided at a non-zero propagation angle within the light guide. Further, the guided light may be collimated according to a collimation factor, in some embodiments.

The method 300 of multiview display operation illustrated in FIG. 8 further comprises scattering out 320 a portion of the guided light as directional light beams using a multibeam element of a plurality of multibeam elements arranged along the light guide. In some embodiments, the multibeam element may be substantially similar the multibeam element 120 of the above-described multibeam backlight 100. In particular, the multibeam element of the plurality of multibeam elements comprises a diffracting grating having diffractive features and filling features that interrupt the diffractive features, according to some embodiments.

As illustrated in FIG. 8, the method 300 of multiview display operation further comprises modulating 330 the directional light beams using an array of light valves to provide a multiview image. In some embodiments, the array of light valves may be substantially similar to the array of light valves 140 described above with respect to the multi-beam backlight 100. In some embodiments, a size of the multibeam element is comparable to a size of a light valve of the array of light valves.

According to various embodiments, a filling fraction of the diffractive features relative to the filling features within the diffraction grating controls a diffractive scattering efficiency of the multibeam element as a function of distance along the light guide. In some embodiments, the filling fraction is configured to increase as a function of distance along the length of the light guide, causing the diffractive scattering efficiency to increase as a function of the same distance.

In some embodiments, the filling features are parallel to a propagation direction of the guided light within the light guide. In some embodiments, the diffraction features are oriented perpendicularly to the propagation direction of the guided light, and gaps formed in the diffractive features by the filling features reduce an area or length of diffractive features to decrease a diffractive efficiency of the diffraction grating. Both the diffractive features and the filling features may comprise one of grooves in a surface of the light guide and ridges on the surface of the light guide, in some embodiments. In some embodiments, a reflective material layer may be located in the grooves of the diffractive features and the filling features or between the ridges of the diffractive features and the filling features. In other embodiments, the reflective material layer may be located adjacent to, but separated from, the grooves or ridges. Openings in the reflective material layer may provide or augment the filling fraction, according to some embodiments. In some embodiments, an extent of the reflective material layer may be comparable to a size or extent of the diffraction grating of the multibeam element. As such, the reflective material layer may be a reflective island, in some embodiments.

Thus, there have been described examples and embodiments of a multibeam backlight, a multiview display, and a method of multiview display operation that employ a filling fraction of diffractive features within a diffraction grating to control a diffractive scattering efficiency of multibeam elements comprising the diffraction grating. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multibeam backlight comprising:
    a light guide configured to guide light in a propagation direction along a length of the light guide as guided light; and
    a plurality of multibeam elements spaced apart from one another along the light guide length, a multibeam element of the plurality of multibeam elements comprising a diffraction grating and being configured to diffractively scatter a portion of the guided light out of the light guide as directional light beams having different directions corresponding to different view directions of a multiview display,
    wherein a filling fraction of diffractive features within the diffraction grating is configured to control a diffractive scattering efficiency of the multibeam element;
    wherein the diffractive features of the diffraction grating comprise an orientation orthogonal to the propagation direction of the guided light, the diffraction grating further comprising filling features having an orientation parallel to the propagation direction and being configured to intersect and interrupt the diffractive features of the diffraction grating to establish the filling fraction as a ratio of an area of the diffractive features relative to an area of the filling features within the diffraction grating; and
    wherein both the diffractive features and the filling features comprise ridges on a surface of the light guide, an intersection between a ridge of the diffractive feature and a ridge of the filling feature being configured to introduce a gap in the diffractive feature to interrupt the diffractive feature.

2. The multibeam backlight of claim 1, wherein the filling fraction is configured to increase as a function of distance along the length of the light guide, the increase in the filling fraction providing a corresponding increase in diffractive scattering efficiency of multibeam elements of the plurality of multibeam elements to compensate for a reduction in an intensity of guided light within the light guide along the light guide length.

3. The multibeam backlight of claim 1, wherein the diffraction grating further comprises a reflective material layer in spaces between the ridges of the diffractive features and the filling features.

4. The multibeam backlight of claim 1, wherein the multibeam element further comprises a reflective island having an extent corresponding to an extent of the diffraction grating and is configured to redirect a portion of diffractively scattered light in a direction of the directional light beams.

5. The multibeam backlight of claim 4, wherein the reflective island comprises a reflective material layer having openings, a ratio of an area of the reflective material layer to an area of the openings within the diffraction grating corresponding to the filling fraction of the diffractive features.

6. The multibeam backlight of claim 1, wherein the multibeam backlight further comprises a light source optically coupled to an input of the light guide, the light source being configured to provide light to be guided as the guided light, and wherein filling fraction of diffractive features of the diffraction grating is configured to control the diffractive scattering efficiency of the multibeam element as a function of a distance from the light source.

7. An electronic display comprising the multibeam backlight of claim 1, the electronic display being the multiview display and further comprising an array of light valves configured to modulate light emitted by the multibeam backlight as the directional light beams to provide a multiview image having a plurality of views with view directions corresponding to the view directions of the multiview display, wherein a size of the multibeam element is between fifty percent and two hundred percent of a size of a light valve of the array of light valves.

8. A multiview display comprising:
a light guide configured to guide light along the light guide as guided light;
an array of multibeam elements spaced apart from one another along the light guide and configured to scatter out the guided light from the light guide as directional light beams having directions corresponding to view directions of the multiview display, a multibeam element of the array of multibeam elements comprising a diffraction grating having diffractive features and filling features; and
an array of light valves configured to modulate the directional light beams to provide a multiview image,
wherein a filling fraction of the diffractive features relative to the filling features within the diffraction grating is configured to control a diffractive scattering efficiency of the multibeam element;
wherein the diffractive features of the diffraction grating comprise an orientation orthogonal to a propagation direction of the guided light, the diffraction grating further comprising filling features having an orientation parallel to the propagation direction and being configured to intersect and interrupt the diffractive features of the diffraction grating to establish the filling fraction as a ratio of an area of the diffractive features relative to an area of the filling features within the diffraction grating; and
wherein both the diffractive features and the filling features comprise grooves in a surface of the light guide, an intersection between a groove of the diffractive feature and a groove of the filling feature being configured to introduce a gap in the diffractive feature to interrupt the diffractive feature.

9. The multiview display of claim 8, wherein a size of the multibeam element is between one quarter and two times a size of a light valve of the array of light valves.

10. The multiview display of claim 8, wherein the multibeam element further comprises a reflective material layer configured to reflect diffractively scattered light in a direction of the directional light beams, the reflective material layer being located in the grooves of the diffractive features and the filling features.

11. The multiview display of claim 8, further comprising a broad-angle backlight adjacent to a side of the light guide opposite to another side of the light guide adjacent to the array of light valves, the broad-angle backlight being configured to provide broad-angle emitted light during a two-dimensional (2D) mode of the multiview display, the array of light valves being configured to modulate the broad-angle emitted light as a 2D Image,
wherein the light guide and multibeam element array are configured to be transparent to the broad-angle emitted light, the multiview display being configured to display the multiview image during a multiview mode and the 2D image during the 2D mode.

12. A method of multiview display operation comprising:
guiding light along a light guide as guided light;
scattering out a portion of the guided light as directional light beams using a multibeam element of a plurality of multibeam elements arranged along the light guide, the multibeam element comprising a diffraction grating having diffractive features and filling features that interrupt the diffractive features; and
modulating the directional light beams using an array of light valves to provide a multiview image, the directional light beams having directions corresponding to view directions of the multiview image,
wherein a filling fraction of the diffractive features relative to the filling features within the diffraction grating controls a diffractive scattering efficiency of the multibeam element as a function of distance along the light guide;
wherein the multibeam element further comprises a reflective island having an extent corresponding to an extent of the diffraction grating and is configured to redirect a portion of diffractively scattered light in a direction of the directional light beams; and
wherein the reflective island comprises a reflective material layer having openings, a ratio of an area of the reflective material layer to an area of the openings within the diffraction grating corresponding to the filling fraction of the diffractive features.

13. The method of multiview display operation of claim 12, wherein the filling fraction controls the diffractive scattering efficiency to compensate for a loss in intensity of the guided light as a function of distance along the light guide, and wherein a size of the multibeam element is comparable to a size of a light valve of the array of light valves.

14. The method of multiview display operation of claim 12, wherein the filling features are parallel to a propagation direction of the guided light within the light guide;

both the diffractive features and the filling features comprise one of grooves in a surface of the light guide and ridges on the surface of the light guide, and the reflective material layer is located one of in the grooves and between the ridges of the diffractive features and the filling features.

* * * * *